April 15, 1952 P. H. WAGNER 2,593,227
OIL FILTER
Filed March 22, 1946 4 Sheets-Sheet 2

Inventor
Paul H. Wagner
by Parker Carter
Attorneys.

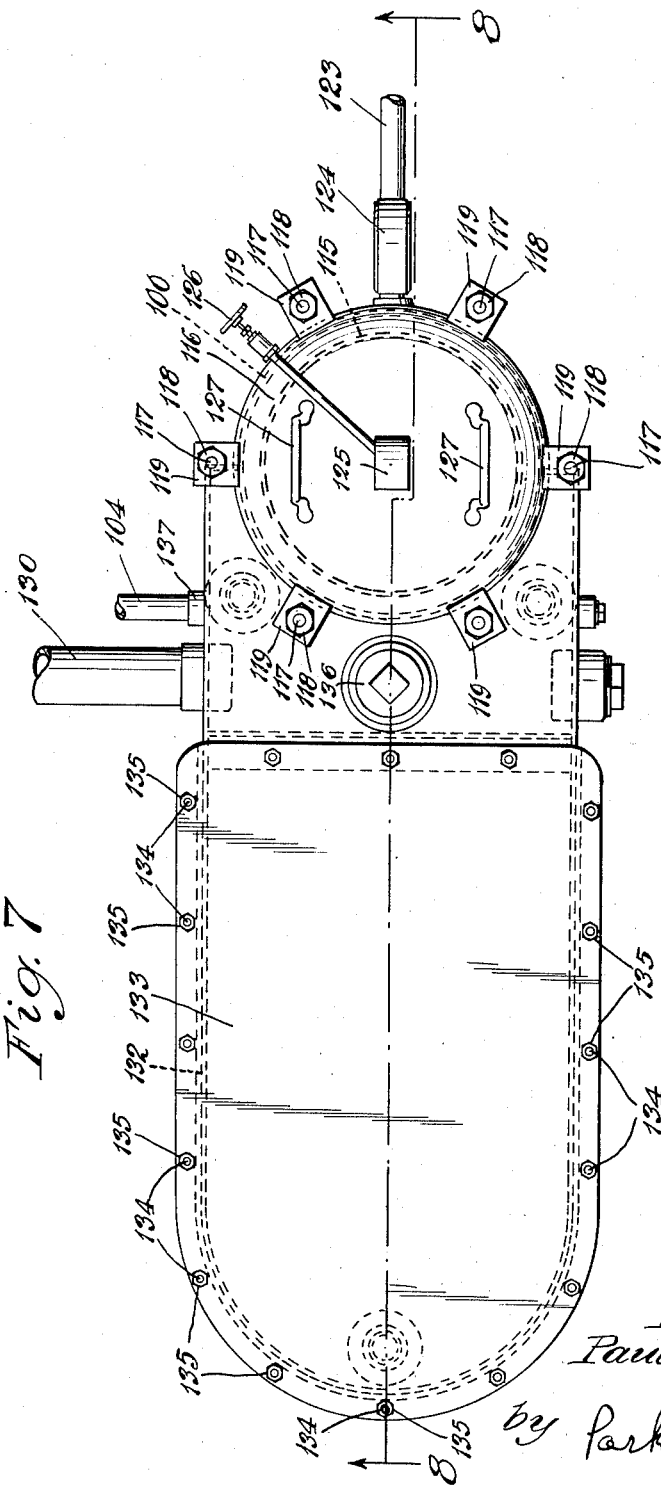

April 15, 1952 P. H. WAGNER 2,593,227
OIL FILTER
Filed March 22, 1946 4 Sheets-Sheet 4

Inventor
Paul H. Wagner
by Parker & Carter
Attorneys.

Patented Apr. 15, 1952

2,593,227

UNITED STATES PATENT OFFICE 2,593,227

OIL FILTER

Paul H. Wagner, Milwaukee, Wis.

Application March 22, 1946, Serial No. 656,345

3 Claims. (Cl. 210—131)

This invention relates to an improvement in filters and has for one purpose to provide an oil filter of maximum efficiency.

Another purpose is to provide an improved filter including means for heating the oil.

Another purpose is to provide an improved filter cartridge.

Another purpose is to provide improved means for preventing leakage of unfiltered oil passing the cartridge.

Another purpose is to provide improved means for maintaining the filter cartridges under adequate compression.

Another purpose is to provide improved means for bringing the cartridges to a reasonably dry condition, so that no dripping occurs upon the removal.

Another purpose is to provide means for indicating when the cartridges need to be removed and replaced.

Other purposes will appear from time to time in the course of the specification and claims.

The invention is illustrated more or less diagrammatically in the accompanying drawings wherein:

Figure 6 is a detail enlarged section of a sealing ring;

Figure 7 is a top plan view of a variant form; and

Like parts are indicated by like symbols throughout the specification and drawings.

Figure 1:
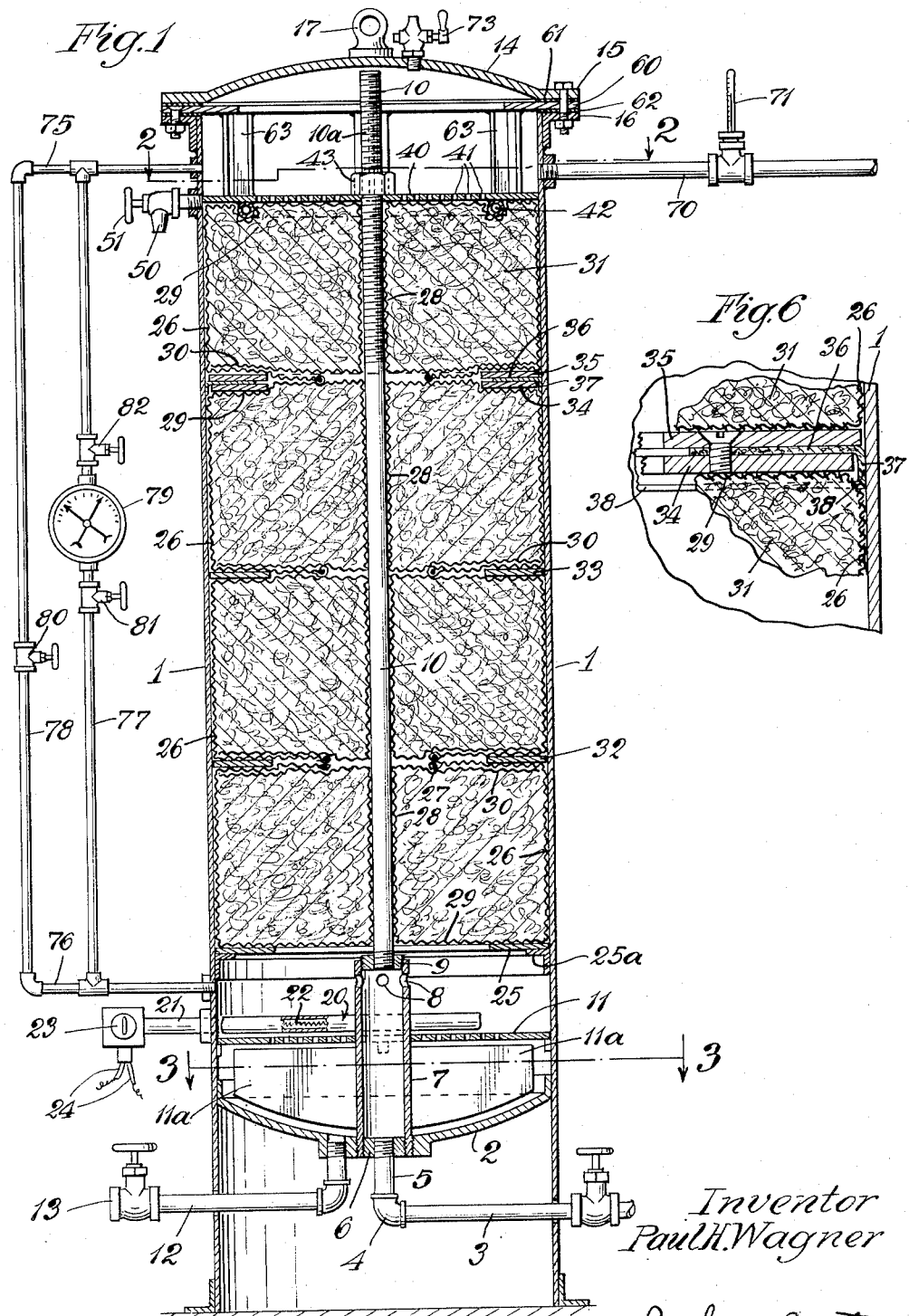
Figure 1 is a vertical axial section.
Figure 2:
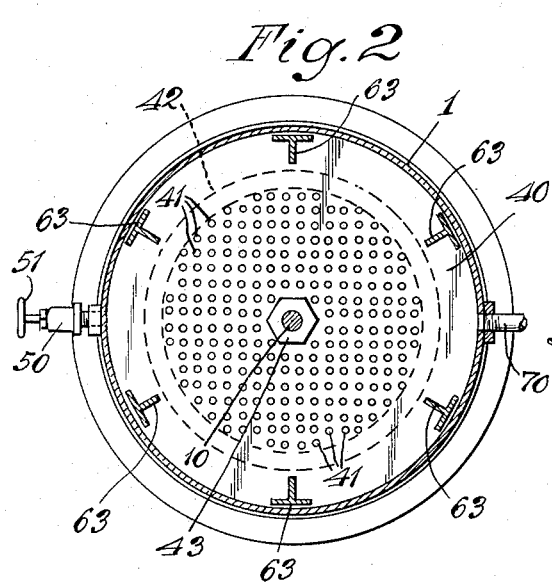
Figure 2 is a section on the line 2—2 of Figure 1.

Referring to the drawings 1 generally indicates an outer housing herein shown as a cylinder or shell of metal. It will be understood that various forms may be employed, but the cylindrical metallic outer housing is advantageous for its strength and economy of space. 2 indicates a lower head or bottom wall shown as downwardly convex. It may be welded or otherwise secured to the cylindrical wall or shell 1 at a point above the bottom of the cylindrical wall. An oil inlet pipe 3 extends inwardly through a lower wall of the portion 1 and is connected by any suitable elbow 4 to the vertical inlet 5 which may be screw threaded or otherwise secured to the bottom plug or wall 6 of an upwardly extending distribution tube 7 which may be of substantially larger diameter. The tube 7 may be welded or otherwise secured to the lower head 2. The tube 7 is provided adjacent its top with a plurality of outlet apertures 8, located substantially above the bottom wall 2. 9 is a plug which may be screw threaded into or otherwise secured to the top of the tube 7. 10 is any suitable tension rod or bolt which may be tapped into the plug 9. The sump area proper is upwardly defined by a perforated disc or strainer 11 which extends horizontally across the space surrounded by the outer shell 1 at a level between the top and bottom of the tube 7 and somewhat below the outlet apertures 8. This upper area, above the member 11, constitutes the receiving chamber. In the space below the member 11 are a plurality of baffles shown as generally radial and indicated at 11a. Their upper edges are spaced downwardly from the plate 11. The baffles may be welded or otherwise secured to the tube 7. Their lower edges are spaced upwardly from the head 2. Their outer edges may be inwardly spaced from the shell 1. The baffles are effective to prevent agitation of material within the sump area below the plate 11. Material from within the sump area may be withdrawn through the outlet duct 12 which penetrates a head 2. It may be closed or controlled by any suitable valve generally indicated at 13. 14 is a removable upper wall or head which closes the top of the cylinder 1 and is shown as having a marginal horizontal portion 15 engaging any suitable top element of the housing 1 such as the angle ring 16 which may be welded or otherwise secured thereto. The cylinder head 14 may be provided with an actuating outer end or eye 17.

The space above the ring 11 defines a receiving chamber, to which the oil to be filtered is delivered through the apertures 8. Extending into this receiving chamber is any suitable heating element 20 which may include a resistance wire. It is advantageous to include an outer housing or tube 21, a resistance 22, and a switch 23 therefor in any suitable actuating circuit including the wires 24 extending to any suitable source of electric power not herein shown.

The heating element may be set or adapted to maintain the oil at a temperature of the order of 140 degrees F., although a variation within a reasonable range is permitted.

Figure 4:
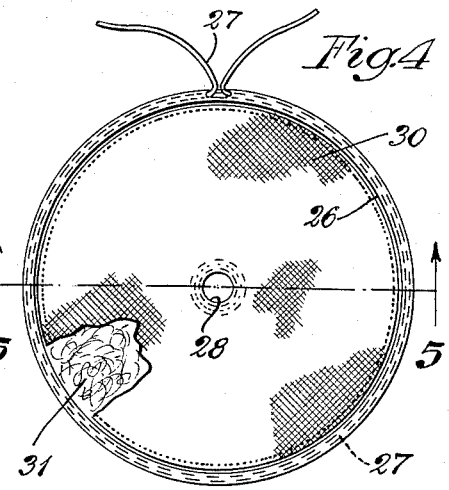
Figure 4 is a plan view of a cartridge.
Figure 3:
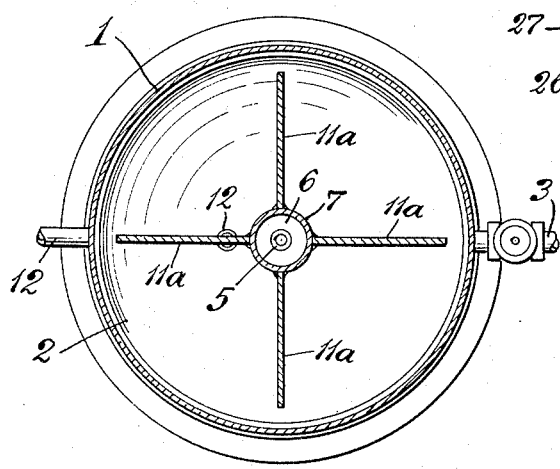
Figure 3 is a section on the line 3—3 of Figure 1.
Figure 5:
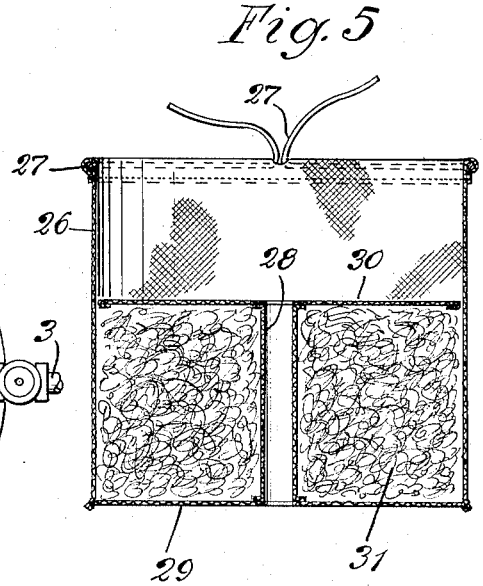
Figure 5 is a section on the line 5—5 of Figure 4.

Located above the top of the receiving chamber is the annular ring 25, the outer diameter of which engages the tank wall. It may for example rest upon the positioning and supporting angle ring 25a. The ring may have a width of the order of 4" in a tank or filter the diameter of which is approximately 20" but a wide variation of size and proportion is permitted. On this ring is located a lower cartridge which may be filled for example with long fiber cotton waste, no material being employed which might bring about a chemical change in the oil. Four cartridges are illustrated and the cartridges may be identical. The cartridges are shown in detail in Figs. 4 and 5. Each cartridge is in the form of a bag of fabric such as canvas, the bag wall being indicated for example at 26. One end of the bag is turned over and sewn to enclose a rope 27, which permits the end of the bag to be drawn together when desired. In the middle of the bag is a canvas tube 28 suitably connected to the bag to provide a passage which surrounds the central tension rod or bolt 10 of the filter. The intermediate diaphragm 30 is not sewn to the outer edge of the bag, but is merely laid over the top of the cotton waste 31, which is compressed between the end and the intermediate diaphragm. Finally the upper edge of the bag is folded over and the rope 27 is drawn tight to form the completed cartridge. It will be observed that cleaning, removing and refilling of the cartridge is thus rendered easy. As will be clear from Figure 1, the cartridges are reversible, some being shown as inverted.

A separating ring 32 is positioned above the lowest cartridge ring and a separating ring 33 is positioned above the cartridge next highest. These separating rings may be of metal and are free to move vertically in relation to the outer housing or cylinder 1. Positioned above the top of the third cartridge from the bottom of the filter, is a separating and leak preventing structure which includes a lower ring 34, an upper ring 35 and an intermediate cup 36 of leather having an outer circumferential flap or lip 37 adapted to engage the inner face of the housing or cylinder 1. The lower outer edge 37 is downwardly turned and is beveled off to provide a thin portion or lip 38. The purpose of this leather is to prevent any leakage of oil upwardly along the inner face of the wall or cylinder 1. It forces all of the oil to pass upwardly through the waste filled cartridges. Above the cup leather packing thus described is a fourth or upper cartridge which is like the remaining cartridges below described. Over the upper cartridge is placed a perforated disc 40 which is provided with a substantial number of holes 41 all of which are preferably located inside of an annular outer solid area which may extend about 3" inwardly from the outer diameter of the disc. Welded to the lower face of the disc is a tube 42, which may be of a diameter of the order of 1" and which forms a complete ring spaced inwardly somewhat from the outer edge of the disc. It is adapted to indent the upper cartridge and thereby to displace the upper edge portion of the upper cartridge outwardly against the inner face of the outer wall or cylinder 1. The upper end of the tension rod or bolt is threaded as at 10a. A nut 43 is effective to draw the upper perforated plate downwardly to compress the cartridges, after the lower end of the bolt or tension rod 10 has been screw threaded into or anchored to the pipe plug 9. The long upper thread 10a of the rod 10 enables this initial compression to be brought about, so as to control the passage of the fine particles contained in the oil. A drain valve 50 with any suitable control handle 51 is located approximately in line with the upper perforated plate 40, its object being to remove all oil over the top of the plate before the removal of the cartridges. This permits withdrawl of the cartridges in a fairly dry state, so that no dripping occurs upon their removal.

Between the ring 15 of the cover or head 14 and the opposed angle flange 16 there is employed a ring 60, properly gasketed on top and bottom, as at 61, 62. The ring extends inwardly into the shell a sufficient distance so that stanchions 63, in the form of T sections, may be placed between the inwardly extending portion of the ring 60 and the perforated plate 40. The ring or holding plate 60 is independently secured to the flange ring 16 of the outer housing or shell 1, so that when the head 14 is removed the perforated plate 40 stays in place, since the stanchions 63, which may be six or more in number, hold the outer edge of the plate 40 down to continue the compression of the cartridges below the ring 40. Thus the head 14 may be removed and the action of the filter observed during regular operation, provided no head on the oil itself occurs at that time.

The discharge pipe 70 from the top clean oil compartment above the perforated ring 40 carries the clean oil to any suitable location, for example for delivery to bearings, or to a clean oil sump. Any suitable thermometer 71 may extend into or be located adjacent the discharge pipe 70 in order to indicate and permit determination of the temperature of the clean oil delivered. The ring 17 at the top of the head 14 facilitates its removal by means of a crane. Any suitable petcock or valve 73 may be employed, in the upper head 14, in order to drain any accumulated air. A relatively small gauge pipe connection extends between the upper clean oil compartment and the lower entering compartment. This may include an upper branch 75 and a lower branch 76, the two branches being connected by pipes 77 and 78. 79 is any suitable gauge which may be employed to measure the difference in pressure between the upper or clean oil delivering chamber and the lower or dirty oil delivery chamber, this difference indicating the degree of sludge which may have accumulated in the cartridges. Reading the difference constitutes a means for obtaining an indication as to when the cartridges should be removed and replaced. The pipe 78 is provided with a bypass valve 80 which is normally closed when the filter is in operation, but which is left open during the period directly following the insertion of any cartridges, to permit oil to enter the upper chamber from the entering chamber below, thereby saturating the cartridges with oil before starting the filter in regular service. I employ any suitable valves 81 and 82 above and below the gauge 79.

Figure 8:
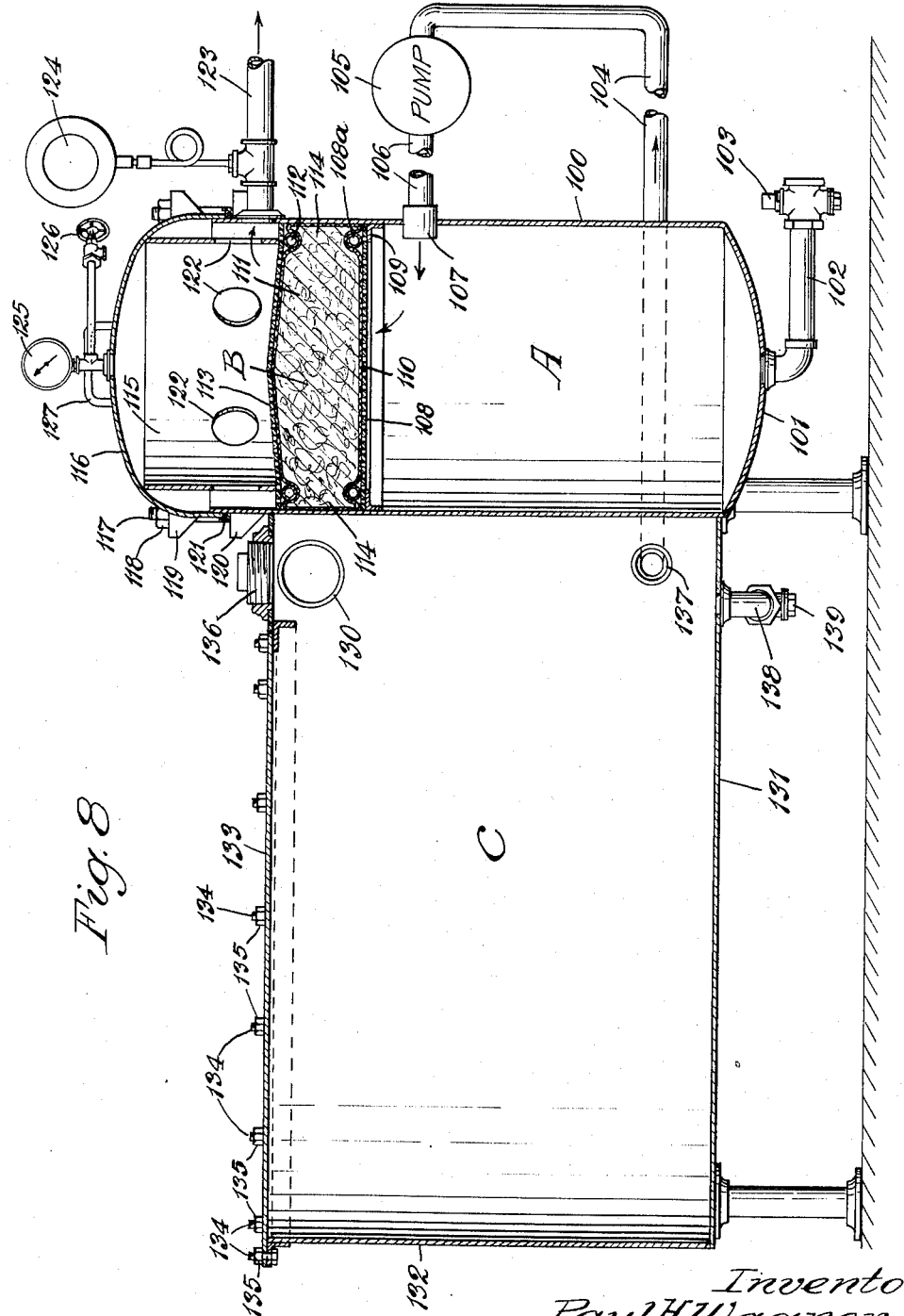
Figure 8 is a section on the line 8—8 of Figure 7.

With reference to the form of Figures 7 and 8 I illustrate a substantially modified form of filter. 100 illustrates a generally vertical axised generally cylindrical filter housing having an upwardly concave lower head 101. 102 is a drain pipe provided with any suitable drain cock structure generally indicated at 103. The liquid to be filtered, for example the oil from the lubrication circuit of a machine, such as a crusher, is withdrawn from the lubrication circuit through any suitable duct 104. It is delivered by any suitable pump 105, to the pump delivery duct 106 which opens as at 107 to the interior of the filter cylinder 100. The space A within the housing 100 may serve as a settling chamber from which solids or sludge may be withdrawn through the outlet 102. The pump 105 maintains a body of liquid under pressure in the chamber A forcing oil upwardly through the filter element generally indicated as B, which includes an apertured bottom plate 108 which rests on a supporting ring 109 or any suitable support extending inwardly from the cylindrical wall 100. Resting on the plate 108 is the filter bag or pad 110 with any suitable pervious filter mass 111 enclosed therewithin. In order to insure a tight seal of the filtering pad against the outer housing 100 I illustrate a lower ring or annulus 108a which rests on or is secured to the plate 108. A corresponding upper ring or annulus 112 rests on or is secured to the upper surface of the filter pad, as defined by the upper portion of the cover 110. The ring 112 is forced downwardly by a pervious or foraminous plate 113, beneath which the ring 112 may be secured. I illustrate the plate 113 as slightly upwardly conical. It will be understood that when the plate 113 is downwardly pressed against the filter pad, the rings 108a and 112 force the circumferential portion 114 of the filter pad B against the interior face of the cylinder 100, thus providing a firm, tight connection which makes the bypassing of unfiltered liquid substantially impossible. The plate 113 may be downwardly thrust by engagement with the lower edge of the inner cylinder 115 which, in turn, is downwardly urged by the removable top cover plate or dome 116. The parts are so proportioned as shown in Figure 8, as to insure a downward thrust of the member 116 against the upper edge of the cylinder 115, when the dome 116 is urged to or held in locked position by any suitable locking bolts 117, with nuts 118 engaging locking lugs 119 which extend outwardly from the dome 116. The bolts 117 may be anchored in abutments or lugs 120 which extend outwardly from the cylinder 100. Any suitable sealing ring 121 is provided. The cylinder 115 is provided with clean oil outlets 122 through which the filtered oil may pass for discharge along the clean oil delivery duct 123. 124 diagrammatically illustrates any suitable pressure actuated switch to prevent machine operation when the oil pressure drops to a predetermined low. 125 indicates any suitable gauge for the oil space within the dome 116. 126 is any suitable manually operable control means for the pressure gauge. 127 is any suitable handle or handles for the dome 116.

It will be understood that the height of the sleeve or cylinder 115 may, if necessary, be varied to produce or maintain the desired downward pressure against the filter pad generally indicated at B. When my filter is used in a machine lubrication circuit, such as the lubrication circuit of a crusher, dirty oil from the crusher is returned along any suitable duct or passage 130 to the interior C of any suitable sump. The sump may be defined by the bottom wall 131 and any suitable side wall 132. 133 indicates a removable main cleanout cover secured for example by bolts 134 and nuts 135. 136 is an access plug. 137 indicates an outlet which may be connected by any suitable means to the duct 104 which delivers dirty oil to the pump 105. The outlet 137 is somewhat above the bottom 131 of the sump C. Solids or sludge may be withdrawn from the sludge chamber C to any suitable outlet duct 138 with its drain cock structure 139.

It will be realized that, whereas, I have described and illustrated a practical and operative device, nevertheless many changes may be made in the size, shape, number and disposition of parts without departing from the spirit of my invention. I therefore wish my description and drawings to be taken as in a broad sense illustrative or diagrammatic, rather than as limiting me to my precise showing.

For example, it will be realized that all dimensions stated are merely given as typical examples.

The use and operation of the invention are as follows:

The oil to be cleaned, which may for example come from a piece of machinery such as a crusher, is delivered through the inlet element 3, 4, 5, to the interior of the pipe or duct 7. It flows thence through the apertures 8, to the receiving or intake space, where it is subjected to the heat of any suitable heating element. The receiving space serves as a settling tank and the heavier components or particles settle in the sump located below the perforated plate or screen 11. The baffles 11a are effective to prevent disturbance in the sump, and to insure ready settling. The impurities or sludge can be withdrawn through the drain pipe 12. The oil may be delivered under any suitable pressure, by any suitable pump not herein shown, or by mere head of liquid. The oil, initially somewhat cleared of its impurities, travels upwardly through the sequence of cartridges and is withdrawn along the outlet tube 70. Its temperature can be determined by any suitable thermometer or temperature indicating device 71. The cartridges, which may be of any suitable number but of which four are shown in Fig. 1, are maintained under substantial compression. The fibrous contents of the individual cartridges, together with the fabric cartridge walls, are effective to trap the finer impurities or particles, and substantially clean oil is delivered along the outlet duct 70.

The tension member 10 and the compression member or plate 40 constitute an easy and efficient method of maintaining the sequence of cartridges under heavy and uniform compression. The projection 42 is effective to seal the upper portion of the final or uppermost cartridge against the opposed inner face of the shell 1. This limits or prevents leakage of the oil about the cartridge. Such leakage is further prevented by the sealing structure shown in Fig. 6, in which the leather element 37 is held or sealed, by oil pressure, against the opposed inner face of the wall or shell 1.

It is advantageous to determine the pressure differential of the spaces above and below the cartridges, in order to determine whether or not removal and replacement is necessary. A double indicating gauge 79 is indicated, with two pointers. One pointer may respond to pressure below the cartridges, when the valve 82 is closed and the valve 81 is opened. The other pointer may respond to pressure above the cartridges, when the valve 81 is closed and the valve 82 is open. Or any other suitable gauge or pressure indicating means may be employed, the above being illustrative.

In order to remove the cartridges and replace them the head 14 is first removed and the tension member or rod or bolt 10 released. It may be tapped into the pipe plug 9 and relief may be had either by rotating the rod itself or by releasing the nut 43, or by a combination of both. In any event the downward pressure of the member 40 is released and the cartridges are withdrawn upwardly through the open end of the shell 1. A partial drainage of the oil makes it possible to withdraw the cartridges with a minimum of the oil drip, the outlet 50 being effective for that purpose. After a new set of cartridges have been positioned within the shell 1, the downward pressure on the plate 40 is renewed, the head 14 replaced. Before starting the filter the bypass 78 may be employed controlled by the valve 80, in order to permit an initial saturation of the cartridges.

The stanchions 63, in connection with the ring 60, are effective to hold the plate 40 down, prior to the return of the head 14, or during the removal of the head 14 for inspection of the cartridges.

With reference to the form of Figures 7 and 8, it will be understood that the use of the sump C is desirable but not essential. The oil is shown as pumped through a single compressed pad. It will be understood that a plurality of pads may be employed.

I claim:

1. In a filter assembly, a tubular filter housing including a lower portion defining a sump, a transverse foraminous plate extending across the filter housing above said sump, a filter pad supported on said plate, means for maintaining said filter pad under compression against the inner face of the side wall of the housing including upper and lower opposed annular compression members engaging the upper and lower faces of the filter pad inwardly of the side wall of the housing, a second foraminous plate overlying the upper face of the filter pad and the upper annular compression member, and means for thrusting said second foraminous plate downwardly against said pad to force said annular compression members into the body of the filter pad and thereby impart a generally uniform outward squeeze of a peripheral portion of said pad against the inner surface of the housing.

2. The filter assembly described in claim 1 wherein the foraminous plate members are dimensioned to extend outwardly beyond said annular compression members respectively to confine the peripheral portions of the filter pad disposed between said annular compression members and the side wall of the housing.

3. The filter assembly described in claim 1 wherein said second foraminous plate member is dished upwardly at its center portion to maintain a lesser degree of compression on the central portion of the filter pad.

PAUL H. WAGNER.

REFERENCES CITED

The following references are of record in the file of this patent:

UNITED STATES PATENTS

| Number | Name | Date |
| --- | --- | --- |
| 3,650 | Thorndike | July 1, 1844 |
| 316,925 | Vogel | Apr. 28, 1885 |
| 620,621 | Veazie | Mar. 7, 1899 |
| 1,994,372 | Smith | Mar. 12, 1935 |
| 2,077,999 | Hurn | Apr. 20, 1937 |
| 2,093,549 | Compton | Sept. 21, 1937 |
| 2,183,877 | Wilkinson et al. | Dec. 19, 1939 |
| 2,232,423 | Alkire | Feb. 18, 1941 |
| 2,280,577 | Guggolz | Apr. 21, 1942 |
| 2,353,433 | Auberschek | July 11, 1944 |
| 2,364,617 | Bolser | Dec. 12, 1944 |

FOREIGN PATENTS

| Number | Country | Date |
| --- | --- | --- |
| 2,896 | Great Britain | 1893 |
| 35,587 | France | Mar. 26, 1930 |